United States Patent [19]
Kosowsky

[11] Patent Number: 6,054,947
[45] Date of Patent: Apr. 25, 2000

[54] HELICOPTER ROTORBLADE RADAR SYSTEM

[76] Inventor: Lester H. Kosowsky, 15 Swan La., Stamford, Conn. 06905

[21] Appl. No.: 09/141,985

[22] Filed: Aug. 28, 1998

[51] Int. Cl.[7] .................................................. G01S 13/89
[52] U.S. Cl. ............................ 342/191; 342/192; 342/25
[58] Field of Search ............................... 342/25, 190, 191

[56] References Cited

U.S. PATENT DOCUMENTS

| | | | |
|---|---|---|---|
| 3,896,446 | 7/1975 | Kondoh et al. | 343/705 |
| 4,233,605 | 11/1980 | Coleman | 342/6 |
| 4,638,315 | 1/1987 | Raven | 342/5 |
| 4,737,788 | 4/1988 | Kennedy | 342/29 |
| 5,614,907 | 3/1997 | Kreitmair-Steck et al. | 342/25 |

FOREIGN PATENT DOCUMENTS

| | | | |
|---|---|---|---|
| 002659934A2 | 9/1991 | France | B64C 27/08 |
| 004229659C1 | 4/1996 | Germany . | |
| WO 92/07282 | 4/1992 | WIPO | G01S 13/48 |

OTHER PUBLICATIONS

Pozar et al., "Design of Millimeter Wave Microstrip Reflectarrays", IEEE Transactions on Antennas and Propagation, vol. 45, No. 2, pp. 287–295, Feb. 1997.

Mittra et al., "Techniques for Analyzing Frequency Selective Surfaces–A Review", Proceedings of the IEEE, vol. 76, No. 12, pp 1593–1614, Dec. 1988.

Pozar et al., "Analysis of a Reflectarray Antenna Using Microstrip Patches of Variable Size", in Electronic Letters, Apr. 15, 1993, vol. 29, No. 8, pp 657–8.

Malibu Research, "Flaps™, Reflector Antennas", pp 1–6, Calabasas, CA.

Klausing, H. et al, "Feasability of a synthetic aperture radar with rotating antennas (ROSAR)", Int'l Radar Conference, pp. 51–56, 1990.

*Primary Examiner*—John B. Sotomayor
*Attorney, Agent, or Firm*—David P. Gordon; David S. Jacobson; Thomas A. Gallagher

[57] ABSTRACT

A radar system for a helicopter having a mast and a plurality of blades coupled to the mast by shaft portions of the blades includes a transmitter and a receiver respectively transmitting and receiving a pulsed radar beam through a feed horn, a generator for generating the radar beam energy for transmission by the transmitter, a processor, a display, and a passive reflectarray deposited on the underside of at least one blade of the helicopter. The reflectarray is a preferably flat array of passive microstrip elements which can impart a phase to the radar beam. A typical microstrip element is a patch whose dimensions may be controlled, and the size of which determines the phase for the location within the array of that element. The reflectarray is provided with a pattern which is designed to scatter the radar beam in a desired shape and direction to produce uniform mapping of the terrain over which the helicopter travels. According to another embodiment, a passive reflectarray is provided to the underside of at least one blade, while another passive reflect is provided to the topside of at least one blade, thereby permit both terrain and sky mapping. The radar system of the invention provides a radar system utilizing a lightweight and inexpensive passive radar reflector for use on helicopters of all sizes, and achieves 360° coverage.

43 Claims, 6 Drawing Sheets

HELICOPTER ROTORBLADE RADAR SYSTEM

BACKGROUND OF THE INVENTION

1. Field of the Invention

This invention relates broadly to radar systems. More particularly, this invention relates to radar systems for helicopters which utilize modified helicopter rotor blades.

2. State of the Art

There is a need for surveillance radar equipment optimized for helicopter use. Such surveillance radar should be able to detect moving and stationary targets anywhere (360°) around the helicopter, obtain target signatures using range profiles, and track while scanning. Potential uses include landing area identification, bomb damage assessment, and other tactical applications. When the need for such radar systems is coupled with the requirements for size and weight limitations for a helicopter, and the low observability required, the design of an acceptable radar system becomes very difficult. In addition, the location and size of the radar system impacts the dynamics of helicopter flight and plays a significant role in the ability of the helicopter to safely and effectively perform its mission. Referring to prior art FIG. 1, surveillance typically requires the ability to map a terrain over 360° in a range (R) of 5 to 10 km, with a range accuracy ($\Delta R$) of 1 meter, and an angular resolution ($\Delta\theta$) of one degree. The range accuracy may be achieved by a waveform design using either a short pulse or a pulse compression technique, each having a bandwidth, $\Delta f=1/T$, where T is the equivalent pulse width corresponding to a 1 meter range. Since $T=\Delta R/2c$, where c is the speed of light, $T=1.6\times 10^{-9}$, and $\Delta f=600$ MHz. The beam width ($\Delta\theta$) of a linear radiating structure of length D (i.e., the radar reflector) is given as $\Delta\theta=\lambda/D$ radians, or $57.3\ \lambda/D$ degrees where $\lambda$ is the wavelength of the radiation and is given as: $\lambda=c/f$. For $\Delta\theta=1$ degree, and a frequency of 35 GHz; i.e., $\lambda=8$ mm, $D=0.5$ meters.

The location of a 0.5 meter 360° scanning reflector on a helicopter poses a problem for all but the largest helicopters. An acceptable, though imperfect, solution for a large helicopter 10 is to mount a rotating reflector 12 in a radome 14 on the top mast 16 of the helicopter, overlooking the blades 18 and body 20 of the helicopter 10. However, this type of installation can have a negative impact on helicopter dynamics by adding intolerable drag and excessive weight to the helicopter. In addition, top mast mounted radar reflectors provide a large radar cross section which dominates the backscatter from the helicopter and enables the helicopter to be more easily detected by others.

In smaller helicopters, the radar systems are often provided in the nose of the helicopter. However, such systems are forward looking only and, therefore, provide only limited terrain coverage. Moreover, forward looking radar systems are generally unable to image objects located above the helicopter, as may be particularly needed in military applications or for detection of overhead cables where the helicopter is flying very low.

SUMMARY OF THE INVENTION

It is therefore an object of the invention to provide a radar system for a helicopter wherein the radar system which does not substantially impact on helicopter dynamics.

It is another object of the invention to provide a radar system for a helicopter wherein the radar system uses a reflector which creates minimal backscatter.

It is also an object of the invention to provide a radar system for a helicopter wherein the radar system uses a reflector which is relatively inexpensive.

It is an additional object of the invention to provide a 360° radar system for a helicopter wherein the radar system is suitable for use on both small and large helicopters.

It is a further object of the invention to provide a radar system for a helicopter which can image objects located below the helicopter, as well as above the helicopter.

Another object of the invention to provide a radar system for a helicopter wherein the radar system uses a reflector which is part of, or may be retrofit to, but does not compromise the structure of the helicopter blade.

In accord with these objects, which will be discussed in detail below, a radar system is provided for a helicopter having a mast rotatable by an engine and a plurality of blades coupled to the mast by shaft portions of the blades. The radar system generally includes a transmitter and a receiver respectively transmitting and receiving a pulsed radar beam through a feed horn toward and from a passive reflectarray located on at least one blade of the helicopter. The system further includes a generator which generates the radar beam energy for transmission by the transmitter and a timing reference for timing the beam generation such that the time of arrival of an echo (energy reflection) of the pulsed radar beam from a target location relative to the time of transmission of the beam can be determined. An azimuthal position detector and a processor and a display are also provided for generation of a radar map.

The feed horn may be mounted on the shaft of the blade and directed at the blade at an offset angle. Alternatively, the feed may be mounted on the rotating mast and a reflector may be employed to direct the transmitted radar beam from the feed horn to the reflectarray, and to direct return signals from the reflectarray toward the feed horn. In both embodiments, a pulse repetition frequency is utilized for transmitting a signal and then receiving a resulting signal.

The reflectarray is a preferably flat array of passive ii microstrip elements whose phase distribution can impart shape to the pulsed radar beam as disclosed in Pozar, D., "Design of Millimeter Wave Microstrip Reflectarrays", *IEEE Transactions on Antennas and Propagation*, February 1997, which is hereby incorporated by reference herein in its entirety. A typical microstrip element is a patch whose dimensions may be controlled, and the size of which determines the reflected phase for the location within the array of that element. See, Pozar, D., "Analysis of a Reflectarray Antenna Using Microstrip Patches of Various Size", *Electronic Letters*, Apr. 15, 1993, which is also hereby incorporated by reference herein in its entirety. The elements of the reflectarray are patterned to scatter the pulsed radar beam in a desired shape and direction to produce uniform mapping of the terrain over which the helicopter travels. Preferably the microstrip elements use substrates on the order of ⅛ to ¹⁄₁₀₀ of a wavelength, and thus the reflectarray structure approaches a thin film structure which can be deposited on the helicopter blade or incorporated within a composite blade with minimum weight and thickness.

According to another embodiment of the invention, a passive reflectarray is provided to the underside of at least one blade, while another passive reflectarray is also provided to the topside of at least one blade, thereby permitting both terrain and sky to mapping.

The radar system of the invention provides a lightweight and inexpensive passive radar reflector for use on helicopters of all sizes. The system permits 360° coverage without the requirement of any additional scanning mechanism.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
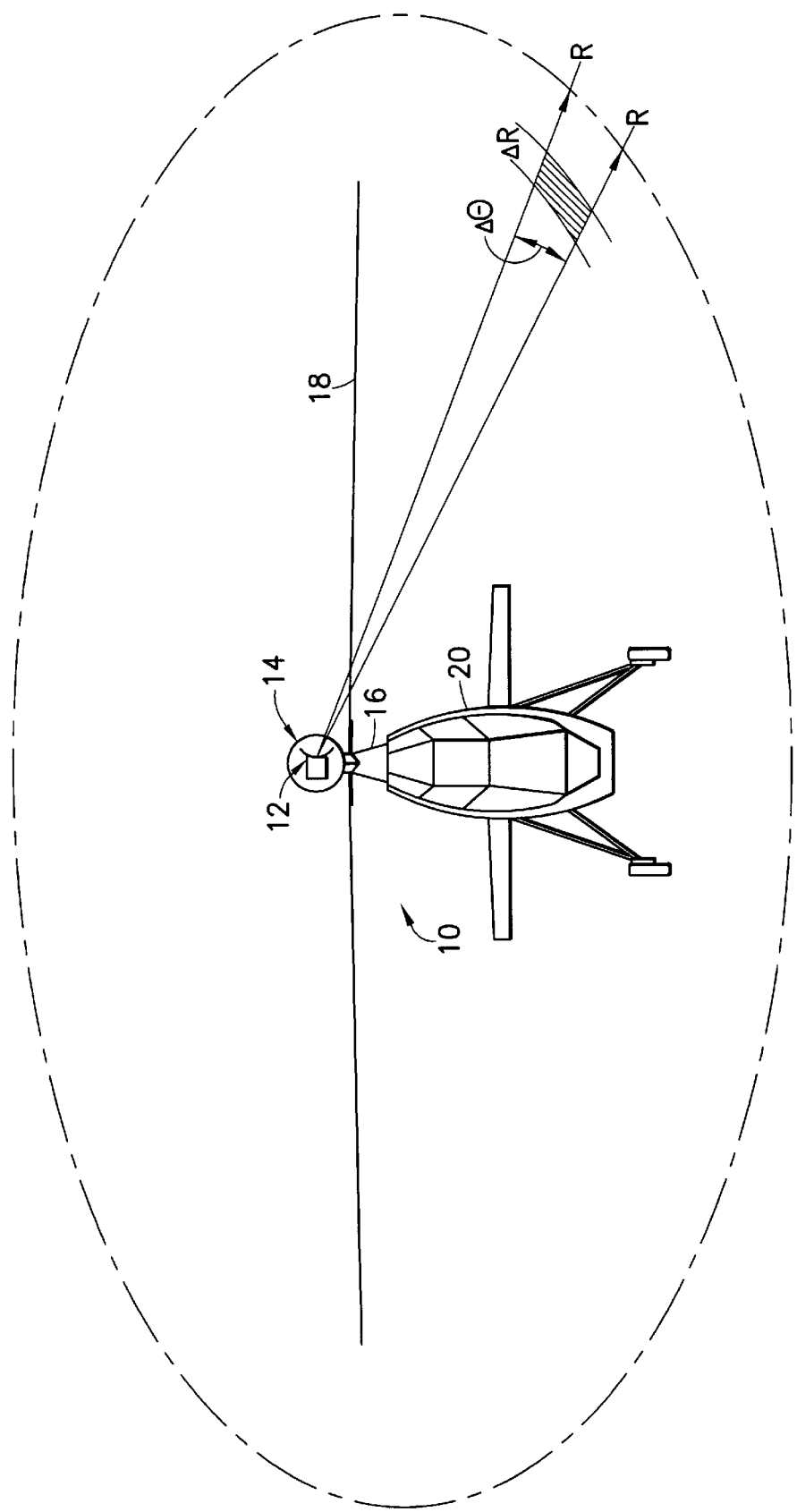
FIG. 1 is a front view of a helicopter provided with a prior art radar system.
Figure 2:
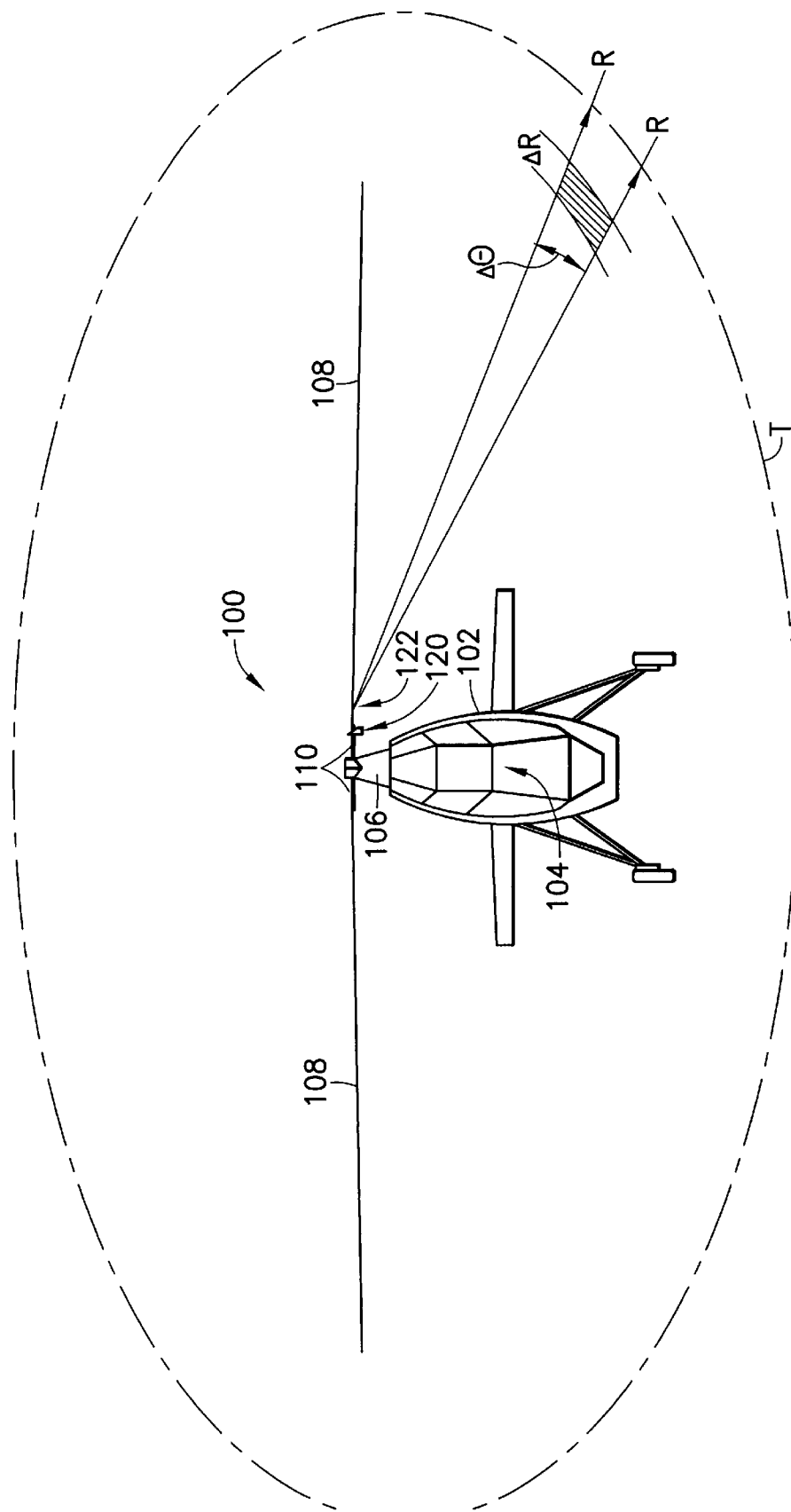
FIG. 2 is a front view of a helicopter provided with a radar system according to a first embodiment of the invention.
Figure 3:
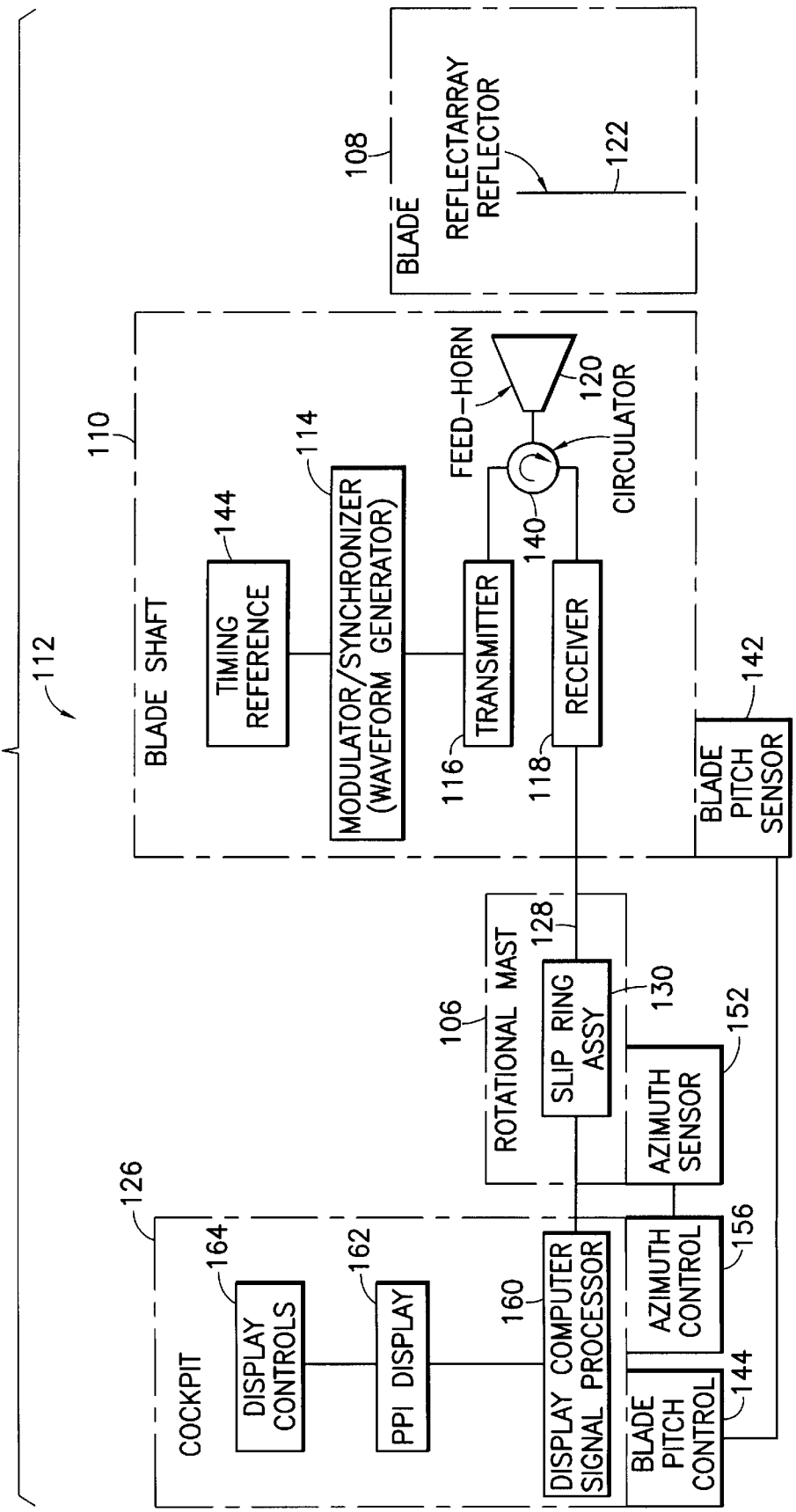
FIG. 3 is a schematic diagram of the radar system of the invention.
Figure 4:
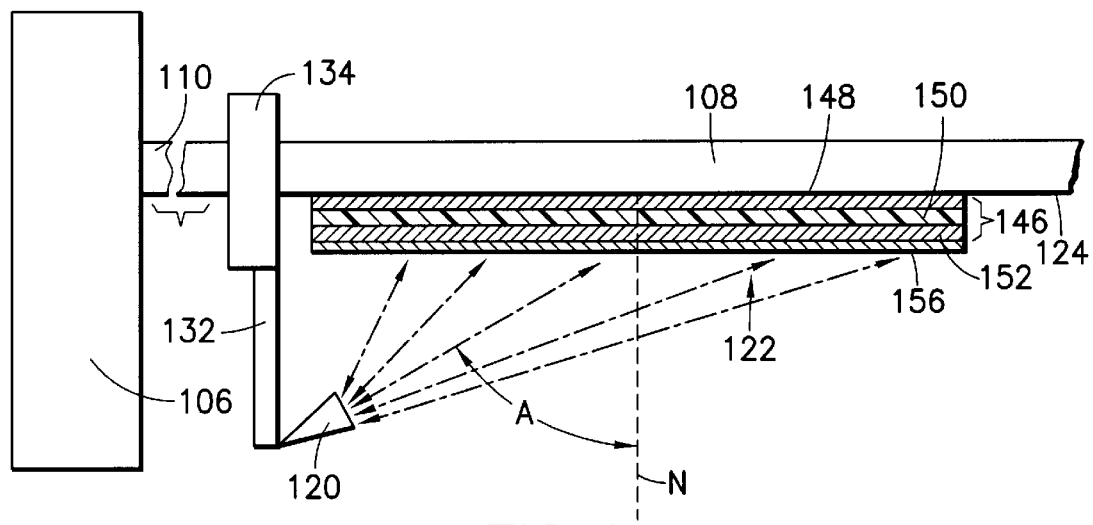
FIG. 4 is a partial side view of a mast and a rotorblade of the helicopter shown in FIG. 2, with a feed and a reflectarray according to the invention, wherein the reflectarray is shown disproportionately for purposes of understanding.

Turning now to FIG. 2, a helicopter 100 is shown having a body 102 with a cockpit 104, a mast 106 rotatable by an engine (not shown), and a plurality of blades 108 coupled to the mast 106 by shaft portions 110 of the blades 108. Referring to FIGS. 2 through 4, the helicopter 100 is provided with a radar system 112 according to the invention that generally includes a transmitter 116 and a receiver 118 respectively transmitting and receiving a pulsed beam of a radar energy through a feed horn 120 coupled to a shaft portion 110 of a blade 108. The radar system 110 also includes a passive reflectarray 122 attached to the underside 124 of at least one blade 108 of the helicopter 100 to shape and reflect the pulsed radar beam from the feed horn 120 in a direction of surveillance and to capture and redirect the returning beam pulse back toward the feed horn 120.

Referring to FIG. 3, the radar system also includes a modulator/waveform generator 114 which generates the pulses of radar energy transmitted by the transmitter 116. A timing reference 144 is coupled to the modulator/waveform generator 114 to provide signaling as to when the pulses are generated in order that the time of arrival of a reflection (echo) of the pulsed radar beam from a target location (the returning radar beam) relative to the time of transmission of the beam can be determined. A cockpit display 126 for imaging the radar information is also provided. The receiver 118 is coupled to the cockpit display 126 via an electrical connection 128 which extends through a slip ring assembly 130 on the mast 106, thereby permitting the electrical connection to extend along the mast without being rotated by the mast. A circulator 140 is provided to effectively switch the feed horn 120 between transmit and receive duties which are described in more detail hereinafter. A blade pitch sensor 142 is preferably provided on the blade shaft to provide feedback data to a blade pitch controller 144 typically located in the cockpit. An azimuth sensor 152 is likewise preferably provided on the rotational mast to provide feedback data to an azimuth controller 156 (rotational velocity controller) typically located in the cockpit. The azimuth sensor and/or azimuth controller provide blade rotational location (azimuth) information, while the pitch sensor and/or pitch controller provide pitch information.

More particularly, the transmitter 116 is preferably a solid state transmitter preferably having an output of, e.g., 10 watts average at 35 GHz (although other frequencies and/or power levels may be utilized). The transmitter is preferably operable in pulse mode with a pulse width determined by the required range resolution. In order to provide a range resolution of 1 meter, the bandwidth of the transmitter is preferably 600 MHz. The receiver 118 is a solid state receiver preferably of the superheterodyne type working in conjunction with a mixer and a local oscillator. The modulation of the echo of the radar beam is extracted by a detector and amplified by a video amplifier for transmission to the cockpit display 126.

As seen best in FIG. 4, according to a preferred aspect of the invention, the feed horn 120 is preferably mounted on a bracket 132 which is secured to the shaft 110 of the blade 108 by a clamp 134. Alternatively, the feed horn 120 is coupled to the mast 106. The feed horn 120 is offset at an angle A from the normal N to the blade 108. With reference to the preferred reflectarray configuration (an array of crossed dipoles, as described below), the offset angle A is preferably approximately 60°. In the preferred embodiment, the spacing between the feed horn 120 and the blade 108 is approximately one foot, and the aperture distribution of the feed horn has a subtended angle of approximately 120°. This corresponds to an 'illuminated length' (length of the reflectarray 122 over which the radar beam are scattered) of 3.4 feet.

Figure 5:
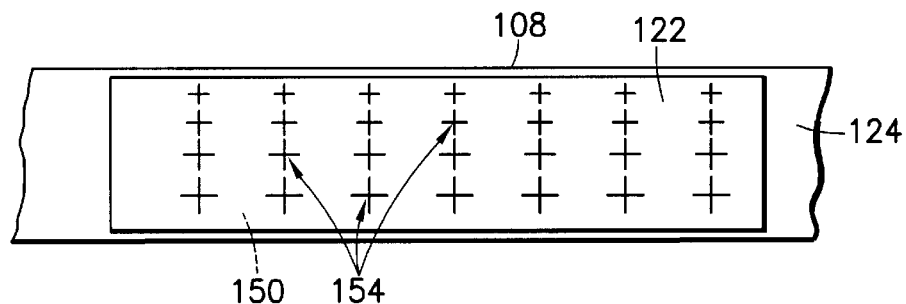
FIG. 5 is a partial bottom view of the reflectarray in FIG. 4.

Referring now to FIGS. 4 and 5, and according to another preferred aspect of the invention, the reflectarray 122 comprises a trilayer structure 146 which is shown in exaggerated proportion for purposes of understanding. The trilayer structure 146 includes a solid conductor first layer (ground plane) 148, a dielectric second layer 150, and a third 'layer' 152 of patterned dot or dipole patches 154 provided on the dielectric substrate layer 150. In a retrofit circumstance, the trilayer structure 146 is attached, preferably with an adhesive, over the contour (which is typically substantially flat) of the underside 124 of the blade 108. In original manufacture, if desired, the trilayer structure may be an integral part of the blade, with the ground plane utilizing the lightening ground plane mesh included in the blade. Regardless, the dielectric layer 150 is preferably of a thickness to provide the patches 154 at a distance of ⅛ to ¹⁄₁₀₀ a wavelength of the radar beam relative to the ground plane 148. Thus, the reflectarray approaches a thin film structure which can be coupled on or incorporated into the blade with minimum weight and thickness. The reflectarray 122 is coupled to blade 108 preferably relatively close to the mast 106, in order to minimize distortion caused by the longitudinal pitch of the blade.

The dielectric substrate layer 150 is preferably comprised of a material which is a relatively good conductor of heat and has the desired dielectric properties; for example, Duroid™ available from Rogers Corp, Kapton™ available from DuPont, Inc. of Delaware, or Taconic TFE™ available from Taconic Corp. of New York. Such heat conductivity enhances the ability of a helicopter blade deicing system which produces heat at the surface of the blade to continue to function. The third 'layer' 152 may be applied over the dielectric substrate 150 by a lithographic process or as a discrete layer. Preferred materials for the third 'layer' include any highly conductive metal such as copper or silver. An electrically-transparent protective fourth layer 156, e.g., a conformal polymer such as Parylene™ available from NovaTran, United Kingdom, may be provided over the third 'layer' 152 to prevent erosion of the patches 154 and resulting beam distortion.

Figure 6:
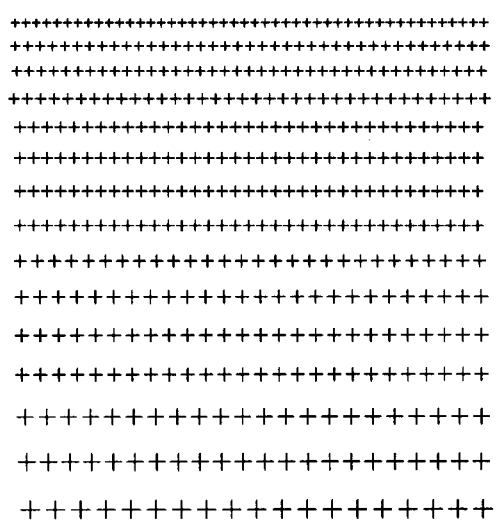
FIG. 6 illustrates an exemplar reflectarray patch distribution.

Referring to FIG. 6, preferred patches 154 of the third 'layer' 152 include crossed dipoles varying in length and spacing. The patch 154 dimensions correspond to different desired phases of the radar beam. Preferably the dimensions are in a range of 0.25 to 0.60 wavelength of the radar beam such that a full 360° of phase shift is achieved. The pattern of the patches 154 creates a phase distribution which determines the shape and direction of the radar beam. That is, the arrangement of the patches 154 and respective sizes of the various patches is such that the reflectarray 122 preferably simulates a doubly curved surface. The simulated curve in one direction (in an X-direction) approximates a parabolic surface which focuses the transmitted radar beam from the feed horn 120 in an azimuthal pattern normal to the blade which is relatively narrow. The simulated curve in the second direction (in a Z-direction) is arranged to provide an elevational pattern normal to the blade which is relatively wide. More preferably, the azimuthal pattern is substantially pencil beam or monopulse, which permits excellent resolution rotationally. The elevational pattern is preferably substantially cosecant squared, with this wide beam being provided to partially compensate for the bending of the blade 108 along its length. As such, the reflectarray imparts phases to the radar beam and scatters the radar beam in a desired shape and direction such that uniform mapping of the terrain over which the helicopter travels is achieved.

Turning back to FIG. 3, the cockpit display 126 includes a display computer/signal processor 160, a plan position indicator (PPI) display 162 coupled to the computer/processor 160, and a plurality of controls 164 for operating the computer/processor 160 and the display 162. The PPI display 162 maps radar targets in azimuth and range for 360° degree rotation of the blades 108. The computer/processor 160 receives input from receiver 118, the timing reference 144, the azimuth controller 156 (or azimuth sensor 152), and the blade pitch controller 144 (or blade pitch sensor 142). The receiver 118 provides the primary data for generation of a display. The timing reference information is utilized to determine the distance (range) from which the received echo is being reflected. If desired, range distortion may be removed through signal processing techniques. Information from the azimuth sensor and/or azimuth controller is used to locate the data rotationally, i.e., radially. Thus, as the blade rotates, data will be received from different radially displaced locations. Information from the rotor blade pitch sensor and/or pitch controller is also preferably provided to the computer so that the received reflection information can be properly aligned. More particularly, and as described in more detail hereinafter, it should be appreciated that if the pitch of the rotor blade is instantaneously changed from a first pitch to a second pitch, the reflection received at the receiver will come from two parallel lines.

Referring now to FIGS. 2 and 3, in operation, the transmitter 116 transmits the pulsed radar beam (i.e., radar beams) through the feed horn 120 which are directed at the reflectarray 122. The reflectarray 122 shapes and directionally scatters the beam pulses toward the terrain being mapped (the outline of the terrain being mapped shown as dotted line T in FIG. 2). The time between pulses is determined by the distance R of the furthermost object which is to be mapped and the return distance from the same.

Thus, if the maximum mapping distance is 10 kilometers, the interpulse period (IP) is 20 kilometers divided by the speed of light c:

$$IP = 20000 \text{ m} \div 3 \times 10^8 \text{ m/sec}$$
$$= 2/3 \times 10^{-4} \text{ seconds}$$

As the speed of the rotor is generally approximately 200 rpm, the rotor blades rotate at 3.3 rotations per second (i.e., each rotation requires approximately 0.30 seconds). It can be further calculated that any point of interest on the ground will be within a one degree sector ($\Delta\theta$) defined by the rotor blade for approximately $8.4 \times 10^{-4}$ seconds. Thus, each point of interest is within a determinable (by the timing reference 144) one degree sector for substantially longer than required for an outgoing pulse and returning reflection, even at maximum mapping distance. Indeed, multiple cycles of transmission and reflection receipt are attained within the one degree sector. The returning reflection of the radar beam is captured by the reflectarray 122 and redirected to the feed horn 120 for reception by the receiver 118. The multiple reflections for each one degree sector may then be integrated by an integrator or correlated. The timing of the returning pulse stream is used by the computer/processor 160 to determine the distance from which the pulse stream is being reflected.

Figure 7:
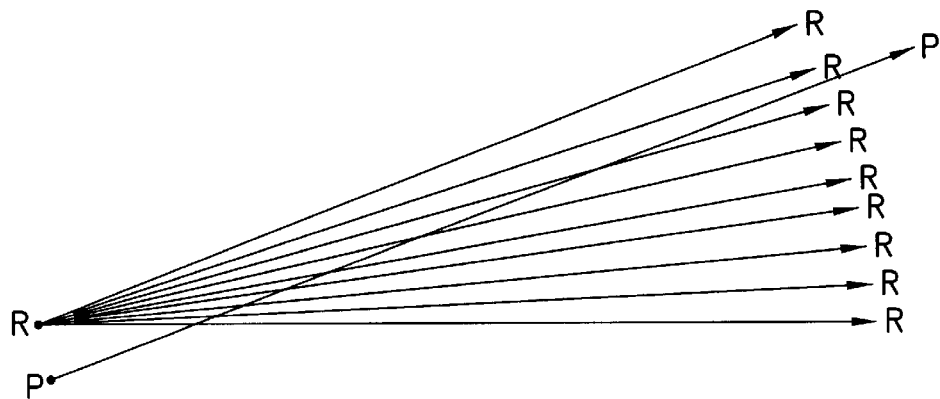
FIG. 7 is a diagram which illustrates how terrain mapping changes with a change in the pitch of the helicopter blade.

The reflection data is used in conjunction with information from the azimuth sensor 152 and/or controller 156 and blade pitch sensor 142 and/or controller 144 to generate a display on the PPI display 162, preferably in one degree increments. More particularly, as the blade rotates (at a given pitch) the associated terrain is likewise radially mapped (as seen in FIG. 7 by lines R). Mapping continues for the full 360° of blade rotation. As the blade can rotate at up to a rate of 3.3 revolutions per second, the entire terrain map can be updated at up to 3.3 times a second. If the blade pitch changes from being horizontal to being angled relative to the ground, the mapping will be extend from points which are not directly under the helicopter, as the normal to the blade will have changed. Thus, as seen in FIG. 7 by line P which is parallel to one of the lines R, the received data may relate to several of the one degree sectors being processed for display. The computer processor accounts for the pitch change accordingly.

Figure 8:
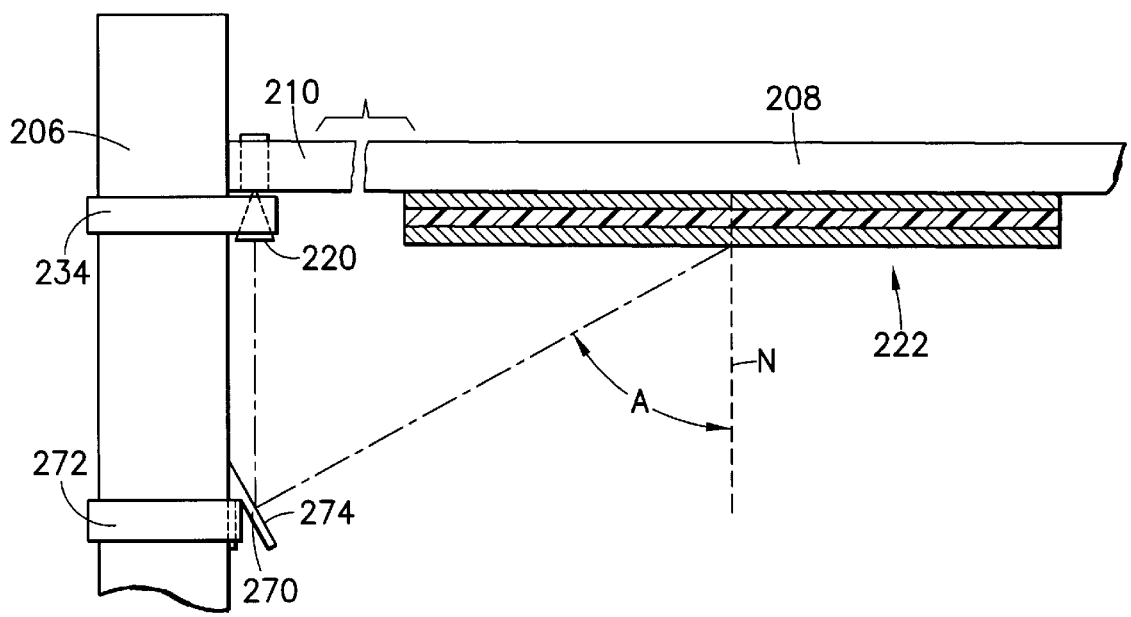
FIG. 8 is a partial disproportionate side view of a second embodiment of the radar system of the invention.

Turning now to FIG. 8, a second embodiment of the invention, substantially similar to the first embodiment (with like parts having numbers incremented by 100), is shown. The particular distinctive feature of the second embodiment relative to the first embodiment is the location of the feed horn 220. The feed horn 220 is preferably mounted on a clamp 234 which is secured to the mast 206, and/or (as shown in dotted line) to the shaft 210 of the blade 208. The feed horn 220 is preferably directed parallel to the normal N to the blade 208. A subreflector 270 is coupled to the mast 206 by a clamp 272 and includes a reflector surface 274 which is offset at an angle A relative to the normal N of the blade such that radar beams transmitted through the feed horn 220 are redirected to the reflectarray 222. Preferably, the subreflector 274 (and horn 220 if mounted to the mast 206) is also mounted to pitch (i.e., rotate around an axis parallel to the longitudinal axis of the blade) synchronously with the blade to maintain a subreflector/blade alignment. With the arrangement of FIG. 8, if desired, the subreflector 274 may be located more than one foot away from the blade and may illuminate a larger area of the blade (which would be provided with a larger reflectarray) for higher gain and resolution. At the same time, with a larger illuminated area, more distortion may be introduced due to bending of the illuminated area along the longitudinal axis of the blade. Thus, there will be a trade-off between gain and distortion unless distortion correction is utilized.

Figure 9:
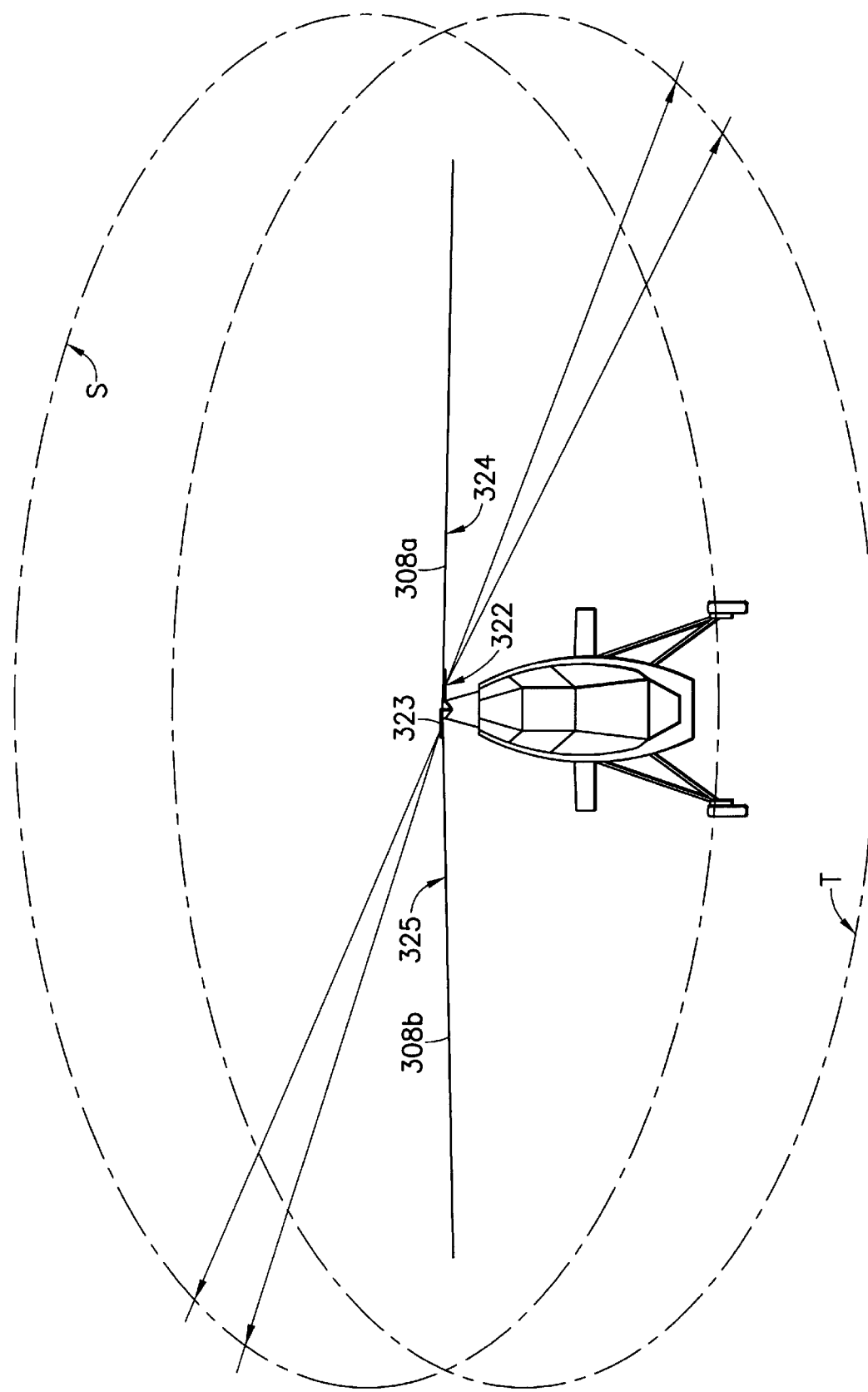
FIG. 9 is a front view of a helicopter provided with a radar system according to a third embodiment of the invention.

Referring now to FIG. 9, according to a third embodiment of the invention, a radar system utilizing two passive reflectarrays 322, 323 is provided to provide mapping of both ground terrain T and the sky S. The first passive reflectarray 322 is provided to the underside 324 of at least one blade 308a, as previously described with respect to the first and second embodiments. The second passive reflectarray 323 is provided to the topside 325 of at least one blade 308b (which may be the same blade or a different blade than 308a) and functions in substantially the same manner as the first passive reflectarray 322, although it may be adapted to differently shape and reflect radar beam. Feed horns (not shown) are provided and oriented to direct radar beam to each reflectarray 322, 323 and receive the echoed radar beam. The radar beams may be discretely generated and transmitted or may be the product of a single transmitter. In addition, the feed horns may feed the echoed radar beam into a single receiver or into discrete receivers. The radar beams may also be distinctly modulated from each other to inhibit beam crosstalk. As the helicopter blade rotates, the first reflectarray 322 operates to radar map targets beneath the plane of the rotorblades, and the second reflectarray 323 operates to radar map targets above the plane of the rotorblades. As such, both ground terrain mapping and sky mapping (e.g., the position of other flying vehicles or cables) is provided.

The several embodiments of the radar system of the invention is provide lightweight (approximately 0.1 kg/m² of blade coverage for a solid copper substrate) and inexpensive passive radar reflectors for use on helicopters of all sizes. The systems achieve 360° coverage without the requirement of any additional scanning mechanism. No modification is required to the internal blade structure, although if desired, the blade may arranged in manufacture to incorporate the reflectarray of the invention.

There have been described and illustrated herein several embodiments of a helicopter radar system. While particular embodiments of the invention have been described, it is not intended that the invention be limited thereto, as it is intended that the invention be as broad in scope as the art will allow and that the specification be read likewise. Thus, while a particular three-layer reflectarray is preferred, it will be appreciated that some helicopter blades are of a composite construction and include a ground plane lightening dispersion layer and a plurality of dielectric layers. As such, the third 'layer' of patches may be provided directly to the helicopter blade in accord with another embodiment of the invention or the second and third layers may be provided to a ground plane of the blade in accord with yet a further embodiment of the invention. In addition, while the reflectarray substrate was stated as preferably having a thickness of between ⅛ and 1/100 of a wavelength, it will be appreciated that other arrangements could be utilized. Furthermore, while the terrain is preferably mapped with a resolution of 1 meter and a Δθ of one degree, it will be appreciated that the resolution may be increased or decreased and that the Δθ may be greater than or less than one degree. In addition, while cross dipole patches are preferred, it will be appreciated that other patches, e.g., rectangular patches, Jerusalem cross patches, circular patches, dipoles, square loops, and square aperture patches, may alternatively be used. See, e.g., Mittra, R., "Techniques for Analyzing Frequency Selective Surfaces", *Proceedinas of IEEE*, December 1988, which is hereby incorporated by reference herein in its entirety. It will also be appreciated that for a patch design other than the preferred crossed dipole patch, the offset angle of the feed horn may have to be adjusted from the 60° angle to compensate for the particular design of the patch. For example, with respect to a Jerusalem patch design the maximum preferred offset angle is approximately 80°. However, regardless of the type of patches used, other horn angles could be used. In addition, while an offset feed horn and feed horn in combination with a subreflector have been disclosed for directing the radar beam pulse to the reflectarray (and then back to the feed horn), it will be appreciated that other feeds such as prime focus feeding (i.e., with the horn directly in front of the reflectarray), and most types of cassegrain feeds may be used. The available space between the body of the helicopter and the blade will influence the type of feed to be used. Moreover, while a particular illuminated length is disclosed, it will be appreciated that the feed horn may be configured to provide different illuminated lengths. Also, while the feed horn is described as directing the transmitted radar beam pulse toward the reflectarray and as further receiving the echo of the radar beam pulse as shaped and directed by the reflectarray, it will be appreciated that separate horn means may be used for directing the beam pulse toward the reflectarray and for receiving the echo. In addition, while a reflectarray and a horn is disclosed on one of the blades, it will be appreciated that reflectarrays and horns may be provided on a plurality of the blades, including all of the blades. Furthermore, while less preferred, the reflectarray may be configured to provide a narrower beam in the Z-direction, with frequency scanning in the Z-direction. If desired, a longitudinal pitch sensor could be added to help provide correction information. It will therefore be appreciated by those skilled in the art that yet other modifications could be made to the provided invention without deviating from its spirit and scope as so claimed.

What is claimed is:

1. A radar system for a helicopter for mapping a target location, said helicopter having a rotor and a plurality of rotorblades, each of the rotorblades having a shaft portion which is coupled to the rotor and a blade portion with a top side, a bottom side, a free end, and a shaft end, said radar system comprising:
   a) a transmitter means for transmitting a radar beam;
   b) a receiver means for receiving a reflection of the radar energy from the target location;
   c) a reflectarray on the blade portion of at least one of the rotorblades at a location other than at the free end;
   d) directing means for directing the radar beam from said transmitter means toward said reflectarray and for directing the echo of the radar beam from said reflectarray to said receiving means;
   e) processing means coupled to said receiver means for processing data related to the energy reflection received by said receiver means;
   f) display means coupled to said processing means for displaying a radar map of the target location based on the data from the processing means,
   said reflectarray adapted to passively shape and reflect the radar beam toward the target location and to passively shape and reflect the energy reflection of the radar beam returning from the target location into the directing means.

2. A radar system according to claim 1, wherein:
   said reflectarray is adapted to parabolically reflect the radar beam in a first direction normal to the blade portion.

3. A radar system according to claim 1, wherein:
said reflectarray is adapted to reflect the radar beam in a cosecant-squared distribution in a first direction normal to the blade portion.

4. A radar system according to claim 2, wherein:
said reflectarray is adapted to reflect the radar beam in a cosecant-squared distribution in a second direction normal to the blade portion.

5. A radar system according to claim 1, wherein:
said ref lectarray comprises a first conductive layer, a second dielectric layer, and a plurality of conducting elements provided on the dielectric layer, said plurality of conducting elements arranged in a pattern adapted to affect at least one of a shape and a direction of the radar beam.

6. A radar system according to claim 5, wherein:
said pattern of said plurality of conducting elements is a lithographic image on said second layer.

7. A radar system according to claim 5, wherein:
said transmitting means transmits the radar beam at a transmitted phase, and each of said plurality of conducting elements affects the transmitted phase such that the radar beam is reflected by said reflectarray at a plurality of reflected phases.

8. A radar system according to claim 7, wherein:
each of said conducting elements of said pattern is a dipole comprising first and second crossed components.

9. A radar system according to claim 8, wherein:
said first and second crossed components of each of said plurality of dipoles are respectively sized to impose one of the plurality of reflected phases on the radar beam.

10. A radar system according to claim 9, wherein:
said first and second crossed components are sized in a range of 0.25 to 0.60 wavelength of the radar beam.

11. A radar system according to claim 5, wherein:
the radar beam has a wavelength, and said pattern of conducting elements is spaced a distance of between approximately one-eighth and one-hundredth of the wavelength from said first conductive layer.

12. A radar system according to claim 1, wherein:
the radar beam is generated by said reflectarray as a relatively narrow beam in an azimuthal pattern, and as a relatively wide beam in an elevational pattern.

13. A radar system according to claim 5, wherein:
said first layer of said reflectarray comprises a portion of the blade portion of the one of the rotorblades on which said reflectarray is located.

14. A radar system according to claim 5, wherein:
said first and second layers of said reflectarray comprise portions of the blade portion of the one of the rotorblades on which said reflectarray is located.

15. A radar system according to claim 1, wherein:
said directing means is adapted to direct the radar beam toward said reflectarray at an angle relative to a normal to said reflectarray.

16. A radar system according to claim 15, wherein:
said angle is approximately 60° to 80°.

17. A radar system according to claim 16, wherein:
said directing means is provided with coupling means for coupling said directing means to one of the rotor and the shaft portion of the rotorblade.

18. A radar system according to claim 15, wherein:
said directing means includes a horn and a reflector, said horn directing the radar beam toward said reflector, and said reflector directing the radar beam toward said reflectarray.

19. A radar system according to claim 18, wherein:
said horn is directed substantially parallel to a normal to said reflectarray.

20. A radar system according to claim 1, further comprising:
g) a modulation means for generating the radar beam for transmission by the transmitting means; and
h) a timing means coupled to said modulation means for determining a time of the generation of the radar beam.

21. A radar system according to claim 1, wherein:
said reflectarray is located on the bottom side of the blade portion of the one of the rotorblades.

22. A radar system according to claim 1, wherein:
said reflectarray is located on the top side of the blade portion of the one of the rotorblades.

23. A radar system for mapping a ground location and a sky location, said radar system for a helicopter having a rotor and a plurality of rotorblades, each of the rotorblades having a blade portion and a shaft portion which is coupled to the rotor, each of the blade portions having a topside and an underside, said radar system comprising:
a) at least one transmitter means for transmitting radar beams;
b) at least one receiver means for receiving reflections of the radar beams;
c) a first reflectarray on the underside of the blade portion of one of the plurality of rotorblades;
d) a first directing means for directing at least some of the radar beams from said transmitter means toward said first reflectarray;
e) a second reflectarray on the topside of the blade portion of the one or another of the plurality of rotorblades;
f) a second directing means for directing others of the radar beams from said transmitter means toward said second reflectarray;
g) processing means coupled to said at least one receiver means for processing data related to the reflections received by said receiver means; and
h) at least one display means coupled to said processing means for displaying radar maps of the ground and sky target locations based on the data from the processing means,
said first reflectarray adapted to passively shape and reflect the radar beam toward the ground target location and to passively shape and reflect the reflections of the radar beam returning from the ground target location into said first directing means, and
said second reflectarray adapted to passively shape and reflect the radar beam toward a sky target location and to passively shape and reflect the reflections of the radar beam returning from the sky target location into said second directing means.

24. A radar system according to claim 23, wherein:
said first reflectarray comprises a first conductive layer, a first dielectric layer provided on said first conductive layer, and a first plurality of elements provided on said first dielectric layer, said first plurality of elements arranged in a first pattern adapted to affect at least one of a shape and a direction of the at least some of the radar beams, and
said second reflectarray comprises a second conductive layer, a second dielectric layer provided on said second conductive layer, and a second plurality of elements provided on said second dielectric layer, said second plurality of elements arranged in a second pattern adapted to affect at least one of a shape and a direction of the others of the radar beams.

25. A radar system according to claim 24, wherein:
each of said elements of said first and second reflectarrays is a dipole comprising first and second crossed components.

26. A radar system according to claim 25, wherein:
said first reflectarray generates narrow beams in an azimuthal pattern, and relatively wide beams in an elevational pattern.

27. A radar system according to claim 23, wherein:
said first directing means is adapted to direct the some of the radar beams toward said first reflectarray at an angle relative to a normal to said first reflectarray, and
said second directing means is adapted to direct the other of said radar beams toward said second reflectarray at an angle relative to a normal to said second reflectarray.

28. A radar system according to claim 23, further comprising:
i) a modulation means for generating the radar beams for transmission by the transmitting means; and
j) a timing means coupled to said modulation means for determining a time of the generation of the radar beams.

29. A radar system according to claim 23, wherein:
said first reflectarray and said second reflectarray are coupled to the same rotorblade of the helicopter.

30. A radar system according to claim 23, wherein:
said first reflectarray and said second reflectarray are on different rotorblades of the helicopter.

31. A radar system according to claim 24, wherein:
said first conductive layer and first dielectric layer of said first reflectarray comprise a portion of the blade portion of the one of the rotorblades on which said first reflectarray is located, and
said second conductive layer and said second dielectric layer of said second reflectarray comprise a portion of the blade portion of the one of the rotorblades on which said second reflectarray is coupled.

32. A radar system according to claim 24, wherein:
said first conductive layer of said first reflectarray comprises a portion of the blade portion of the one of the rotorblades on which said first reflectarray is located, and
said second conductive layer of said second reflectarray comprises a portion of the blade portion of the one of the rotorblades on which said second reflectarray is located.

33. A radar system according to claim 23, wherein:
said at least one transmitter means comprises a first transmitter means for transmitting said at some of said radar beams, and a second transmitter means for transmitting said others of said radar beams, and
said at least one receiver means comprises a first receiver means and a second receiver means for receiving the reflections.

34. A wave-shaping reflector for a helicopter blade, said reflector comprising:
a rotorblade having a blade portion, said blade portion having a first tip portion and a second non-tip portion said second non-tip portion having a conductive layer, a dielectric layer provided over said conductive layer, and a pattern of conductive radar beam phase-affecting elements provided on said dielectric layer, said pattern adapted to passively shape and reflect incident radiation.

35. A reflector according to claim 34, further comprising:
a protective layer substantially covering said phaseaffecting elements.

36. A reflector according to claim 34, wherein:
said conductive layer and said dielectric layer are integral with said rotorblade and said elements are provided on said rotorblade.

37. A reflector according to claim 34, wherein:
said conductive layer is integral with said rotorblade and said conductive layer and said elements are provided on said rotorblade.

38. A reflector according to claim 34, wherein:
said pattern of said elements is a lithographic image on said dielectric layer.

39. A reflector according to claim 34, wherein:
said reflector is for a radar system which generates and transmits a radar beam and is adapted to receive a reflection of the radar beam, and
each of said elements of said pattern is a dipole comprising first and second crossed components.

40. A reflector according to claim 39, wherein:
said first and second crossed components of each of said dipoles is respectively sized to impose one of the plurality of reflected phases on the incident radiation.

41. A reflector according to claim 39, wherein:
said first and second crossed components are sized in a range of 0.25 to 0.60 wavelength of the incident radiation.

42. A reflector according to claim 34, wherein:
the incident radiation has a wavelength, and said pattern of elements is spaced a distance of approximately one-eighth to one-hundredth of the wavelength from said conductive layer.

43. A helicopter, comprising:
a) a body having a cockpit provided with a plurality of controls for operating said helicopter;
b) a motor coupled to said body;
c) a rotor rotatable by said motor;
d) a plurality of rotorblades each having a shaft portion coupled to said rotor and each having a blade portion with a shaft end and a free end; and
e) a radar system for mapping a target location, the radar system including,
i) transmitter means for transmitting a radar beam,
ii) receiver means for receiving a reflection of the radar beam from the target location,
iii) reflectarray means on the blade portion of at least one of the rotorblades at a location other than at said free end, said reflectarray means for shaping and reflecting the radar beam and for shaping and reflecting the reflection of the radar beam returning from the target location;
iv) directing means for directing the radar beam from said transmitter means toward said reflectarray and for directing the reflection of the radar beam from said reflectarray to said receiving means,
v) processing means coupled to said receiver means for processing data related to the reflection received by said receiver means, and
vi) display means coupled to said processing means for displaying a radar map of the target location based on the data from the processing means.

* * * * *